March 4, 1947. R. S. WILDER Re. 22,848

ILLUMINATING UNIT FOR OPTICAL PROJECTORS

Original Filed Oct. 26, 1944

Inventor
Raymond S. Wilder
by Fabek Cushman & Grover
Att'ys.

Reissued Mar. 4, 1947

Re. 22,848

UNITED STATES PATENT OFFICE 22,848

ILLUMINATING UNIT FOR OPTICAL PROJECTORS

Raymond S. Wilder, Waltham, Mass.

Original No. 2,409,328, dated October 15, 1946, Serial No. 560,387, October 26, 1944. Application for reissue December 7, 1946, Serial No. 714,751

2 Claims. (Cl. 88—24)

This invention pertains to optical instruments, especially to an optical comparator or micro-projector designed in particular to project onto a screen, in juxtaposition, enlarged images of a workpiece (for instance a small machine part) and a standard part with which the workpiece is to be compared. For optimum accuracy of comparison it is essential that the light source be intense, in order to produce the desired contrast between image and background, and also that the illumination be uniform and such that irregular shadows, halos or "ghost" images may not be formed. Customarily the light source employed in such instruments is a single incandescent lamp arranged to illuminate the back of the object, that is to say, that side of the object which is remote from the objective lens, and thus the image formed on the screen is merely a shadow image. However, when comparing certain types of work, for instance pieces having projecting portions, cavities, etc., it is not possible to obtain the desired results merely by shadow images produced by transmitted light. In such cases it is desirable to direct light from a suitable source against the forward surface of the work, that is to say, that surface which is toward the objective lens, so that an image is formed by reflected light, or partly by transmitted and partly by reflected light. However, the use of reflected light is attended with substantial difficulties, especially by reason of the space limitations of such an apparatus, in particular the presence of the objective lens and its support between the work-supporting table and the screen. Under these conditions, the reflected light, as heretofore provided, has been non-uniform, with the result that troublesome irregular shadows, halo effects, etc. are produced which interfere greatly with the accurate comparison of the workpiece and standard part as their images appear on the screen.

The principal object of the invention is to provide an illuminating unit, applicable to an instrument of the kind referred to, by means of which the front surfaces of the workpiece and standard part may be intensely illuminated by light of such uniform character as to provide sharp, clear and substantially shadowless images on the screen. A further object is to provide an illuminating unit designed to form an image of the workpiece, by reflected light, which will be substantially free from halo, "ghosts" or other troublesome effects such as commonly result from the use of a single light source for this purpose. A further object is to provide an illuminating unit easily applicable to and removable from the objective lens support of such an instrument and which is designed to carry a series of independent light sources disposed symmetrically in a circle coaxial with the optical axis of the lens. A further object is to provide an instrument of the class described having provision for so supporting a series of incandescent lamps of commercial type as to provide substantially uniform illumination for that surface of the workpiece which is presented toward the objective lens. Other and further objects and advantages of the invention will be pointed out in the following more detailed description and by reference to the accompanying drawing wherein Fig. 1 is a small scale, diagrammatic vertical section through a micro-projector of a commercial type, showing the projector provided with the improved illuminating unit of the present invention;

Figure 3:
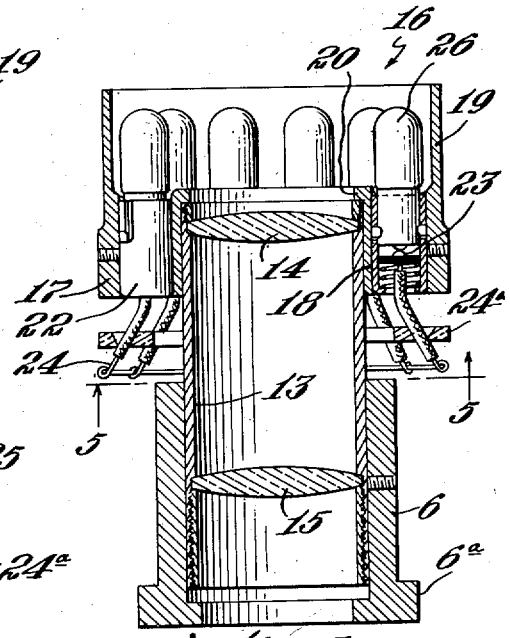
Fig. 3 is a vertical section substantially on the line 3—3 of Fig. 2.
Figure 5:
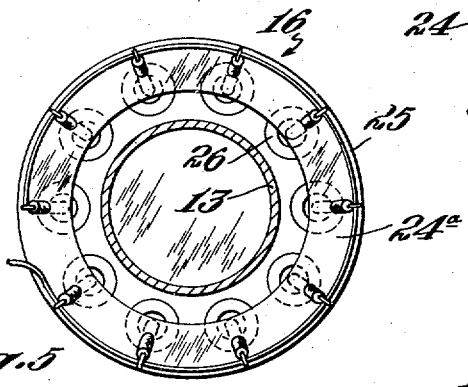
Fig. 5 is a bottom plan view, with parts in horizontal section, substantially on the line 5—5 of Fig. 3.

Referring to the drawings, the numeral 1 designates one of a pair of parallel posts or standards rigidly connected together and which form a support for a vertically movable horizontal arm 2 which carries the worktable 3, the latter being of glass or other suitable transparent material. The posts 1 also support a bracket 4 which carries a truncated conical hollow post 5. At its upper end this post 5 is provided with a socket for the reception of any one of a plurality of interchangeable objective-lens sets of different magnifying power, respectively. Each lens set has a base portion 6 (Fig. 3) each of said base portions being of the same external diameter so as to fit into the socket in the post 5. The objective lens, when thus mounted, has its axis vertical and is designed to direct an image of an object mounted on the worktable onto a mirror 7 which reflects this image onto a screen 8 where it may be observed. The mirror 7 is housed within a dark-box 9 which may, if desired, form the support for the posts or standards 1. At their upper ends the posts or standards 1 support a bracket 10 which carries adjusting mechanism 11 by means of which the position of the worktable may be vertically adjusted relatively to the objective lens. The bracket 10 may also support a housing 12 within which a light source, for instance a single incandescent lamp, having its filament at the optical axis of the objective lens, and which furnishes a beam of light directed onto the worktable by condensing lenses within the housing 12 so as to form an image of the object by transmitted light.

The base 6 of each objective-lens set is a heavy hollow cylindrical part having a bottom flange 6a which seats in the socket in the top of the post 5. Within this hollow cylindrical member 6 there is mounted a cylindrical tube 13 in which the objective lenses 14 and 15 are mounted.

The structure thus far described is of substantially usual type, designed to form a shadow image of the workpiece by transmitted light, it being understood that the lamp within the housing 12 may be provided with a switch so that this light source may be used or not as desired.

Figure 1:
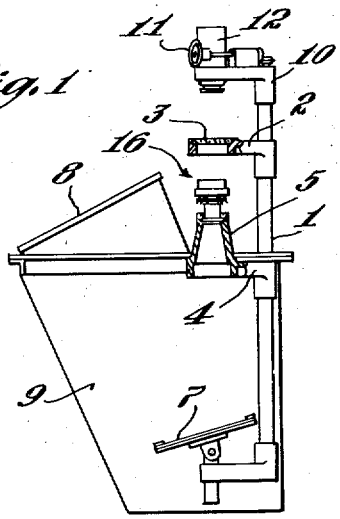
Figure 2:
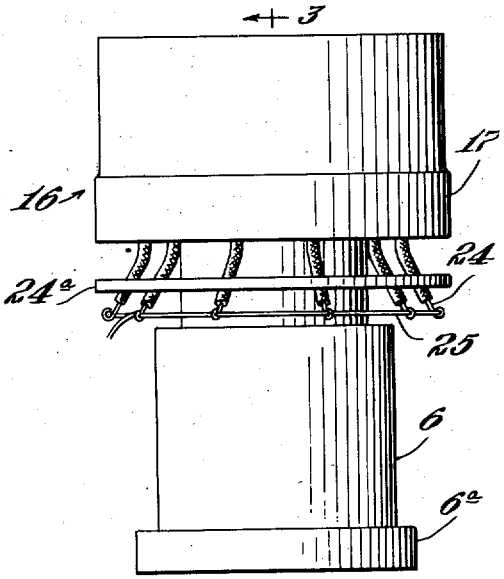
Fig. 2 is a side elevation, to larger scale, of the light unit.
Figure 4:
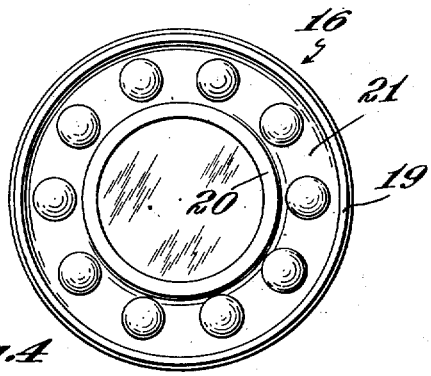
Fig. 4 is a plan view of the device of Fig. 2.

In accordance with the present invention there is provided an illuminating unit 16 for use with any one of the objective lens sets. This illuminating unit comprises an annulus 17, which may be a casting, or which may be made by machining it from bar stock, or which, if desired, may be of suitably moulded synthetic resin or the like. This annulus 17 has inner and outer radially spaced cylindrical walls 18 and 19, the inner wall defining an aperture of a size to receive the upper end of the lens tube 13, preferably with an easy sliding fit. To limit downward movement of the illuminating unit relatively to the tube 13, the unit is provided with a suitable stop, here shown as an inwardly directed flange or shoulder 20 at the upper edge of the inner wall 18. The walls 18 and 19 are radially spaced apart a distance such as to provide an annular chamber of substantially the minimum radial dimensions capable of accommodating commercial incandescent lamps of the type illustrated and as hereinafter described, the walls 18 and 19 being united by an annular, horizontal web 21 (Fig. 4) in which there is formed a series of circumferentially spaced bores with their axes vertical. These bores are arranged symmetrically with reference to the axis of the annulus and, as here shown, there are ten of these bores spaced 36° apart; a greater or lesser number of such bores may be provided, if desired, but it is believed that there should be at least four of these bores. Each bore has mounted within it a socket 22 of a standard kind, such as is employed for holding an incandescent lamp of commercial type. Each of these sockets is provided with an insulated contact 23, here shown as resiliently supported for engagement with the center contact of the lamp, the wall of the socket being grounded on the annulus 17 if the latter is of metal and if not being connected to a suitable electrical conductor (not shown). Obviously, if desired, screw type sockets may be used instead of the push type sockets here shown. The contacts 23 of the several sockets are connected by individual insulated conductors 24 to a conductor 25 which extends concentrically around the tube 13 below the annulus 17 and out of contact with the tube when the illuminating unit is mounted on the lens-supporting tube. The several conductors 24 pass through openings in a disk 24a of insulating material which holds the conductors 24 in proper relative position and which also holds the conductor 24a outwardly and away from the tube 13.

Each socket 22 receives a lamp 26, the axes of the sockets being so located that the filaments of the lamps are out of the field of vision of the objective lens so that images of the filaments are not formed by the lens. Preferably the outer wall 19 of the unit extends upwardly above the top of the lamps 26 so as to protect them from mechanical injury. Preferably, also, the inner surface of the wall 19 is of reflecting character thereby to utilize the light from the lamps in the most effective way. Since the outside dimensions of the illuminating unit are so small it may readily be mounted upon the lens tube 13 and beneath the worktable without interfering with the normal operation of the apparatus, and the worktable may be adjusted downwardly until the work is very close to the light source if desired.

In use, the unit 16 is slipped down over the lens-supporting tube, and when the lamps 26 are lighted (being supplied with current from any suitable source) a powerful beam is directed upwardly against the workpiece resting on the table 3. Although the several light sources, constituted by the individual cylindrical lamps 26 are independent, yet by reason of the arrangement of these light sources in closely spaced relation and symmetrically in a circle, the light thrown onto the workpiece is substantially uniform; moreover, the angle of incidence of the light from the several lamps is the same so that all sides of the workpiece are equally illuminated and the image of the workpiece (formed by the objective lens) is uniformly bright, free from shadows, distortions, halo effects, etc., thus providing the optimum condition for comparison of the images of the workpiece and a standard part.

It may be noted that the sources of light are commercial incandescent lamps, readily available at reasonable cost, so that the illuminating unit is relatively cheap to make and to maintain and in these respects is far superior to devices heretofore suggested in which special annular lamps are depended upon to provide the light. Moreover, this improved unit is readily applicable to and removable from a lens-supporting tube so that the interchange of lenses is not interfered with. When it is not desired to use reflected light, the unit may be removed for storage, leaving the apparatus exactly as it was before application of the illuminating unit.

While one desirable embodiment of the invention has been shown by way of example, it is to be understood that the invention is to be regarded as broadly inclusive of any and all modifications which fall within the scope of the appended claims.

I claim:

1. A micro-projector of the kind wherein the image of an object supported upon a work table is projected onto a screen by an objective lens mounted in a tubular support, characterized in having an illuminating unit mounted on the lens support and comprising an annular housing having an inner cylindrical wall defining an aperture designed to receive the upper end of the tubular lens housing with a sliding fit, said inner wall having a stop shoulder engageable with the end of the tubular support to limit axial movement of the housing, the housing also having a radially extending web portion provided with a series of spaced lamp sockets whose axes are parallel to that of the housing, the sockets being disposed symmetrically with respect to the optical axis of the lens and being so spaced laterally from said axis that lamps disposed in the sockets are out of the field of vision of the lens, the housing also having an outer cylindrical wall of a depth greater than the heights of the filaments of lamps disposed in the sockets, said outer wall being of an internal diameter such as to afford approximately just sufficient space for the lamps arranged in the sockets and having an inner reflecting surface.

2. An illuminating unit for use in a microprojector of the kind wherein the image of an object, supported on a work table, is projected onto a screen by an objective lens mounted in a tubular support, said unit comprising an annulus having a central aperture of such diameter as to receive the tubular lens support, the annulus having inner and outer radially spaced coaxial walls united by a radial web, the inner wall defining the aperture which receives the tubular lens support, said inner wall having an inwardly directed stop shoulder engageable with the end of the tubular lens support thereby to limit axial movement of the annulus relatively to the support, the web having therein a series of circumferentially spaced sockets designed to receive incandescent lamps of commercial type, the sockets being disposed symmetrically relatively to the axis of the annulus and the outer wall of the annulus being of a depth to provide a protective shield for lamps mounted in the sockets.

RAYMOND S. WILDER.